United States Patent [19]

Ruben

[11] 3,748,452

[45] July 24, 1973

[54] ELECTRONIC CASH REGISTER

[75] Inventor: Murray A. Ruben, Belmont, Mass.

[73] Assignee: Alan M. Vorhee, Montgomery County, Md.

[22] Filed: Nov. 17, 1971

[21] Appl. No.: 199,685

[52] U.S. Cl. ................ 235/168, 235/156, 340/172.5

[51] Int. Cl. ........................... G06f 7/385, G06f 7/50

[58] Field of Search .................... 235/168, 156, 157, 235/160, 176, 92 AC; 340/172.5

[56] References Cited

UNITED STATES PATENTS

| | | | |
|---|---|---|---|
| 3,330,947 | 7/1967 | Alpert et al. | 235/176 |
| 3,061,192 | 10/1962 | Terzian | 235/157 |
| 3,267,436 | 8/1966 | Alpert et al. | 340/172.5 |
| 3,294,960 | 12/1966 | Townsend | 235/160 |

*Primary Examiner*—Joseph F. Ruggiero
*Attorney*—John W. Malley et al.

[57] ABSTRACT

An electronic cash register whereby a manually operable keyboard produces signals indicating the keys operated which are received by an electronic microprocessor which in turn derives, stores and displays transaction data. The microprocessor includes a random access memory for storing variable transaction information, including totals, etc., and a read only memory for storing the instructions which derive the transaction information from the signals received from the keyboard. Any of a number of peripheral devices such as tape printers, displays, tape cassette recorders, inputs to computers, etc. can be coupled to the microprocessor to receive transaction information. The system is connected to a voltage source by circuitry which not only regulates the voltage applied from the source but also provides standby power for an interval after the source is disconnected to protect the stored information and permit continued operation.

8 Claims, 8 Drawing Figures

ELECTRONIC CASH REGISTER

BRIEF DESCRIPTION OF THE PRIOR ART AND SUMMARY OF THE INVENTION

The invention relates to an electronic cash register.

Cash registers having keyboard portions for manually entering transaction information, and display portions such as a tape printer, a visual display device or both, have been available and in wide use for many years. These devices receive the information manually entered into the keyboard and provide to the user transaction data, such as totals, the amount of tax, the change required, etc. Most such devices use mechanical elements such as cams and the like in order to carry out the operations required to provide the transaction data. However, recently electronic cash registers, which employ electronic elements in place of mechanical elements, have begun to be adapted. The patents to Levy, U.S. Pat. No. 3,541,526 and Lange et al., U.S. Pat. No. 3,335,407, describe cash registers using electronic elements, as do many other patents and other publications readily available to the public.

Cash registers are used by many different types of retailers who sell all kinds of goods from food to diamonds to clothing. Hitherto it has been the general practice to have a limited number of models of a given cash register which are sold to different types of merchants. Particularly with respect to cash registers using mechanical elements to form transaction calculations, it has not been practical to provide capabilities which an individual merchant or a limited market might desire, or to modify those capabilities after the machine has been installed. Just designing the number of models which are required to provide the different types of merchants with machines which satisfy even their minimal desires adds considerably to the cost of the register, while still not providing users with the exact capabilities which they desire.

One way in which this problem can be at least partly alleviated is by employing a keyboard which can be configured through the insertion of any of a number of different types of keys to provide input capabilities which can be quickly and simply varied either before or after installation as desired by the retailer. This keyboard, one embodiment of which is described in detail below, is also described in a co-pending application Ser. No. 199,478 filed herewith entitled PROGRAMMABLE KEYBOARD AND KEYS, the disclosure of which is explicity incorporated herein by reference.

The present invention relates to an electronic cash register which can be used with such a programmable keyboard and which can itself be quickly and simply programmed in order to carry out the exact transaction functions which a given individual retailer may desire and which can be re-programmed as desired after installation. This is accomplished by using a microprocessor to perform the transaction calculations which are needed to produce, from the transaction information manually entered on a keyboard or otherwise transmitted to the system by the user, the desired transaction data which can then be displayed and/or recorded. The microprocessor includes a first memory, which is preferably a random access memory, for storing the variable transaction data derived from the keyboard, and this data can include different types of totals including totals for employees, totals for categories, totals for an individual group of transactions, totals relating to taxable items or non-taxable items, etc. Storing the transaction data in a memory in this fashion permits the system to be easily and simply configured to provide the totals or other information storage which an individual user may want. Further, storing the information in this fashion permits it to be readily retrieved in an audit operation by a manager or other supervisory personnel. Instructions for deriving that transaction data from the information received from the keyboard or other input device are stored in a second memory, which is preferably a read only memory, for containing the instructions which generate the transaction data and the programs for using those instructions. Storing the instructions and programs in this way permits the calculator to be easily programmed as desired by the individual merchant to provide the exact information which he wants.

According to a further aspect of the invention, the electronic elements of the calculator, including the two memories, are connected to a conventional power source by conventional circuitry which not only provides good regulation of the voltage but also provides a stand-by power unit for supplying electrical energy to the system in the event that the power source is disconnected to not only permit continued use of the device, but also to protect against loss of information resulting from a power failure.

Many other objects and purposes of the invention will become clear from the following detailed description of the drawings.

DETAILED DESCRIPTION OF THE DRAWINGS

Figure 1:
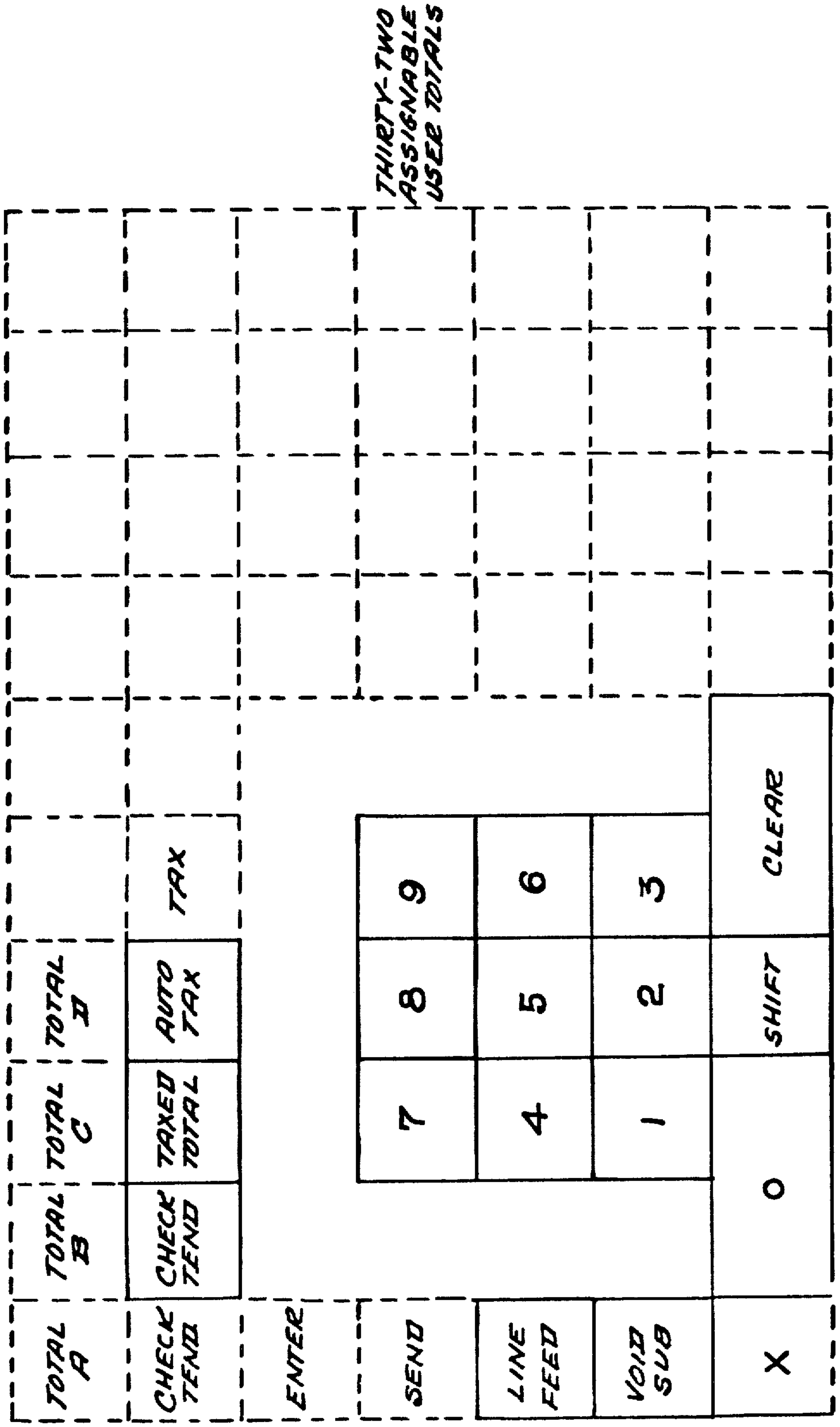
FIG. 1 shows a schematic view of a keyboard suitable for use with an electronic cash register.
Figure 2A:
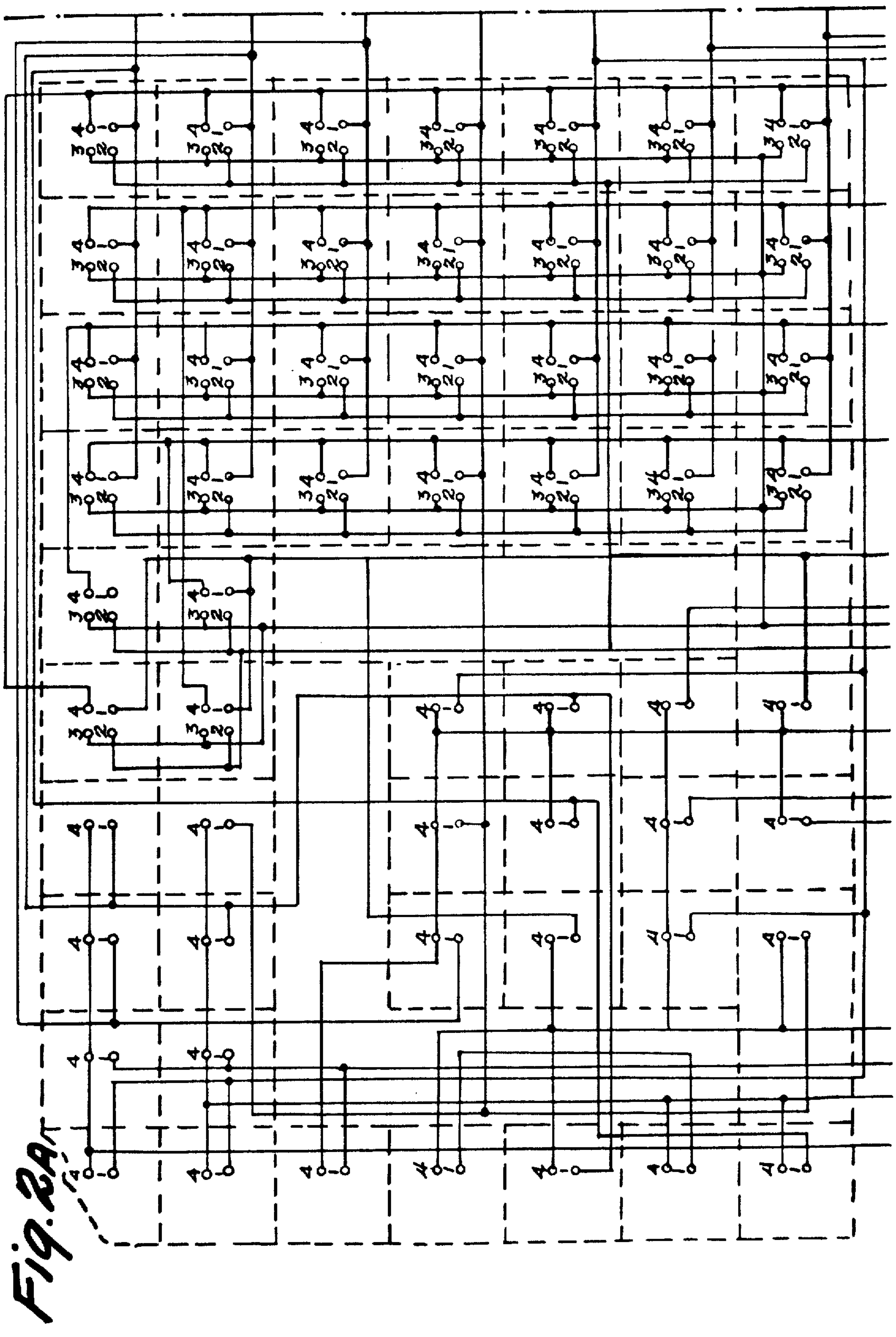
FIG. 2A–2D show a schematic view of the keyboard circuitry which receives the information entered by manual operation of the keys and determines the location and the type of a manually operated key.
Figure 2B:
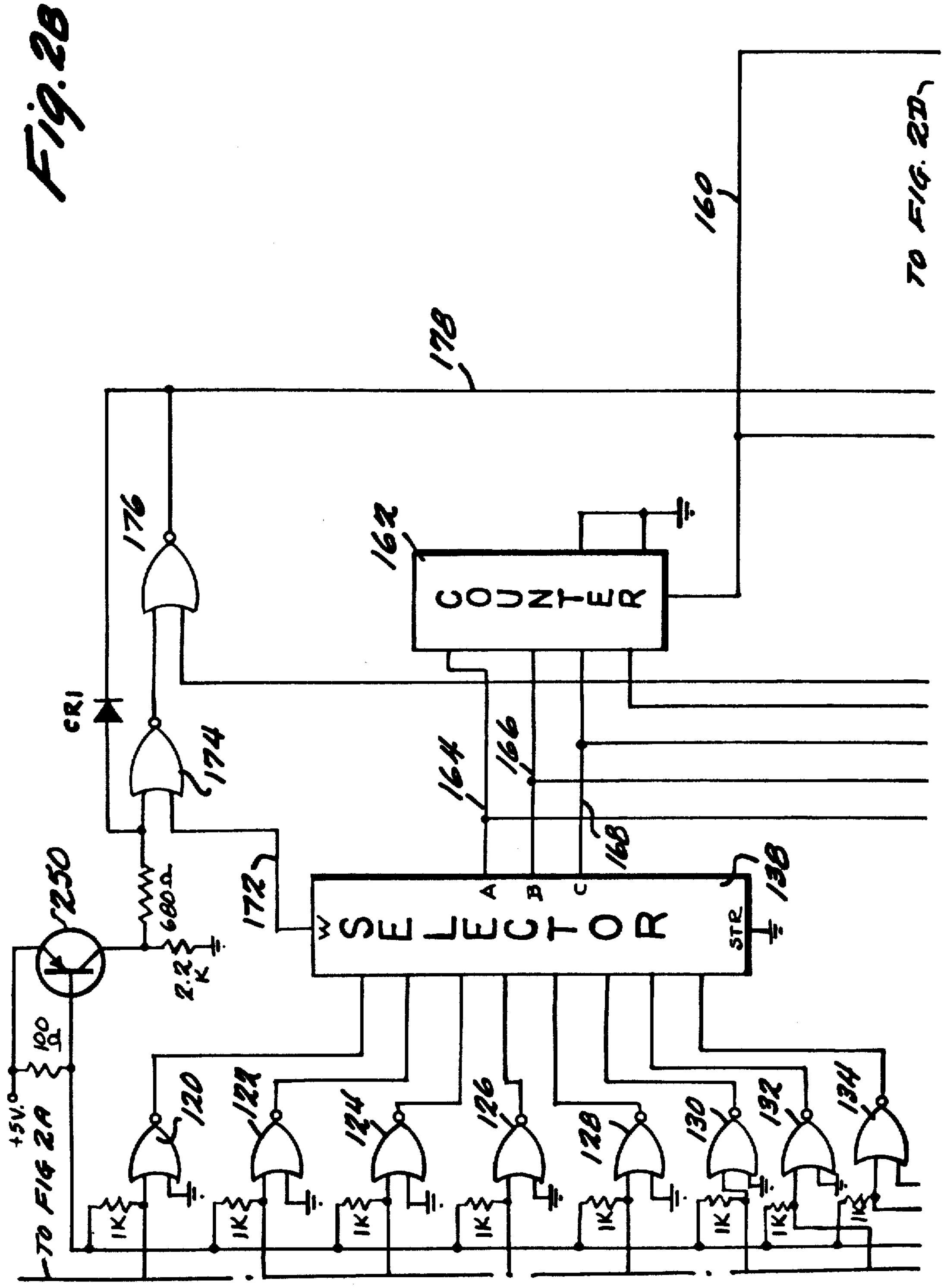
Figure 2C:
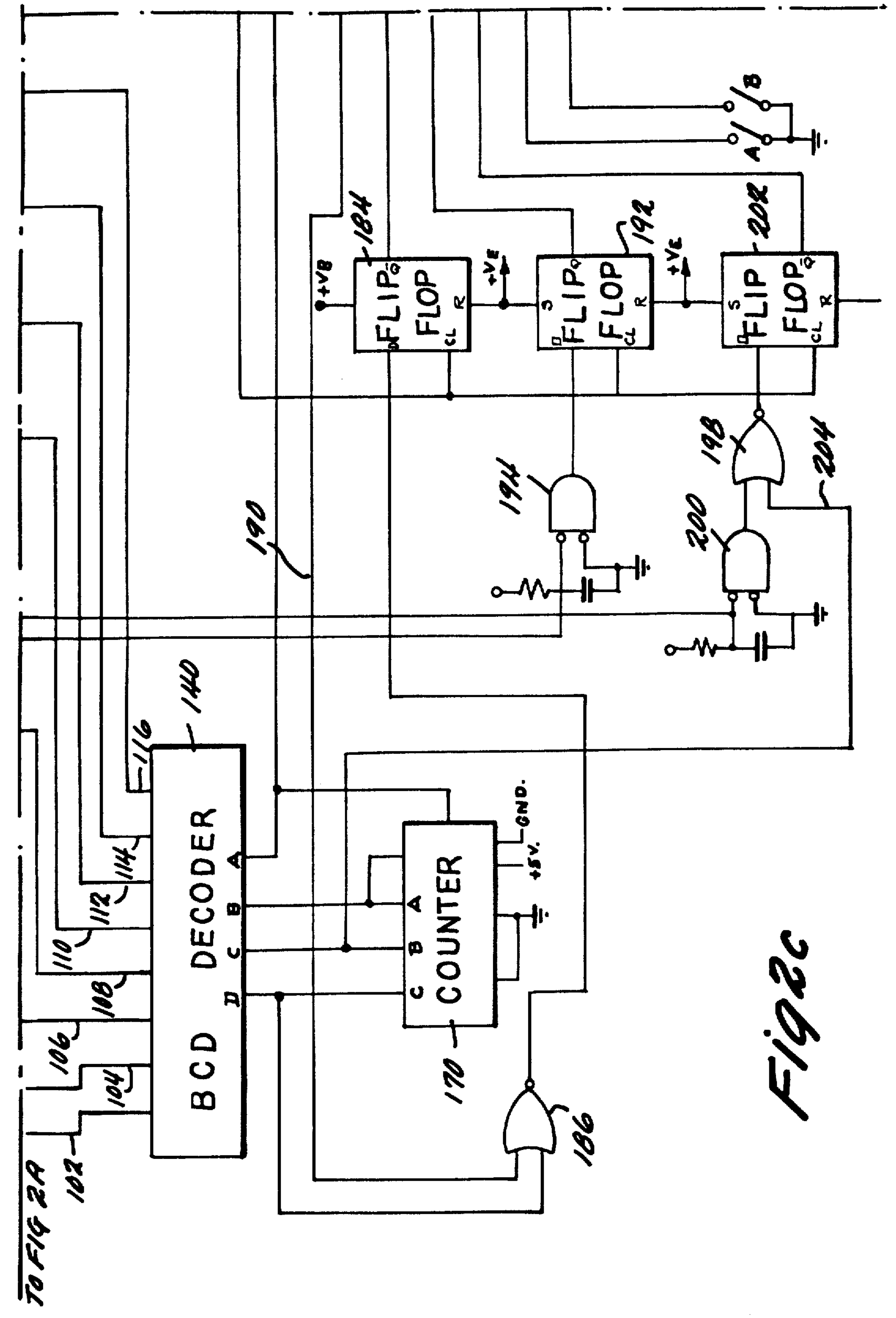
Figure 2D:
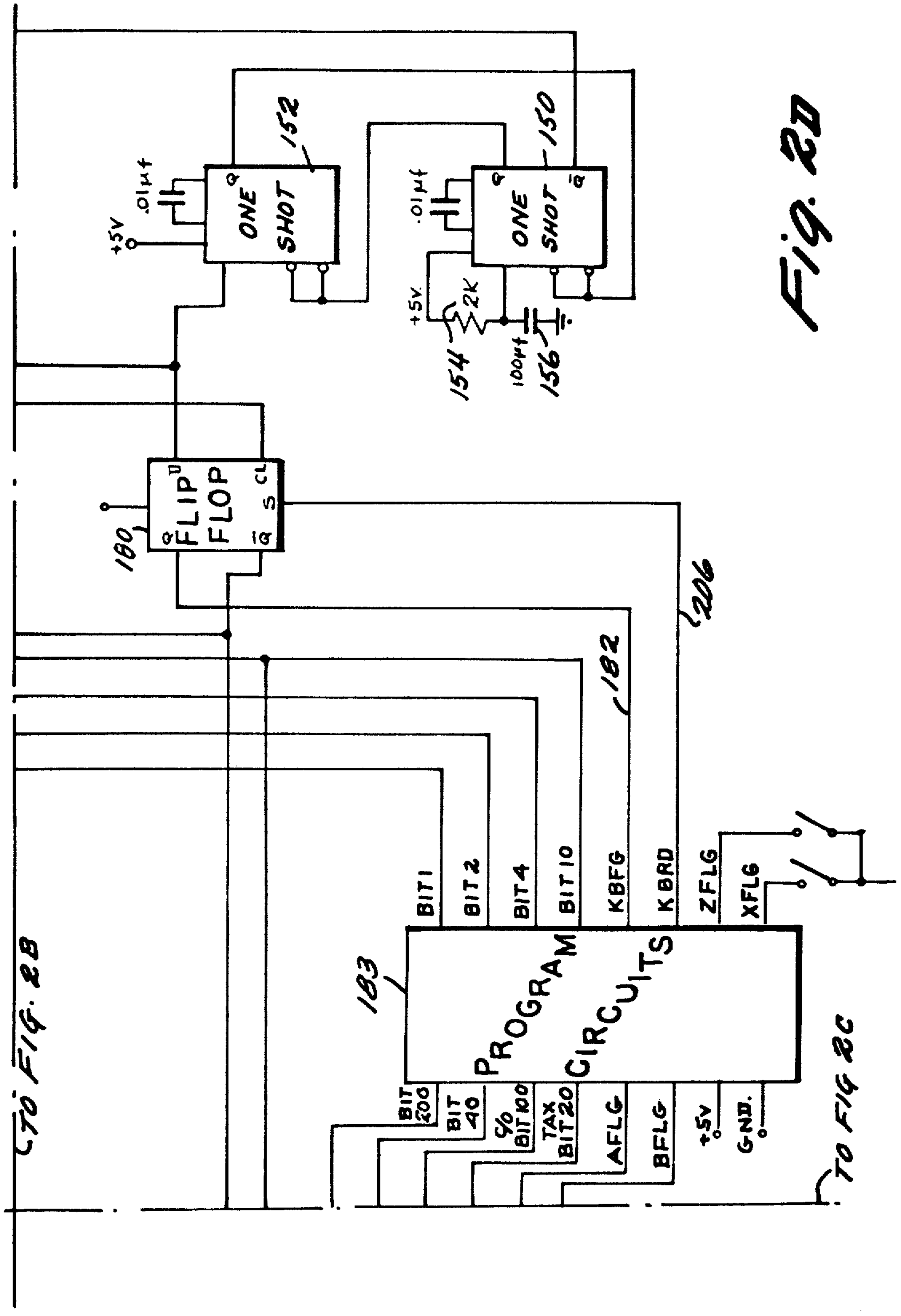

Reference is now made to FIG. 1 which shows a schematic view of a keyboard layout designed to be used with an electronic cash register. That keyboard is described in greater detail in a co-pending application, Ser. No. 199,478 filed on this date, entitled PROGRAMMABLE KEYBOARD AND KEYS, and the disclosure of that application is explicitly incorporated herein by reference. It should be further understood that while the keyboard and keys shown in FIG. 1 and claimed in the above-mentioned application have particular utility in connection with an electronic cash register as described, there is no intention to limit the keyboard to that usage, and it should be apparent that the board concepts as described below find application in many other types of keyboard, and permit such keyboards to be readily and simply programmed simply by the insertion of different types of keys. Further, while this novel keyboard finds particular utility in the novel cash register of this invention, that cash register can be used without the novel keyboard and the invention of this application is not limited to that keyboard.

To briefly describe the keyboard layout of FIG. 1, a number of keys enter numerical information, for example, the price of an item which is being purchased and totalled or the number of such items. Four employee transaction total keys are also included for permitting the entry of information with respect to the individual who is recording the sale or the type of sale (charge, cash, wholesale, etc.). A paper feed key is employed to advance a paper tape on which a record of the transaction or the like is produced. The X key, as described in greater detail below is used for multiplication of the price of an item and the number of the items, both being entered on the numerical keys. The void key can be depressed to cause a transaction just entered to be subtracted from the total and voided. At the end of information entry, the operator hits the tax total key which causes the display of the taxable sub-total on an indicator. The tax amount can be calculated by the machine using the auto-tax key or numerically entered, using the tax key and one of the total keys operated to display the total amount due from the transaction. Next, the operator enters the amount tendered in the numerical part of the keyboard and operates the cash tendered key, or the check tendered key. The system then preferably cal-culates the change and displays the same. Operation of the cash or check tendered key also causes the drawer to be opened for returning the change to the customer.

The send and enter keys permit the keyboard to be tied into a communication system to a computer or the like. Likewise the keyboard can be used with either of two cash drawer systems A and B tied to the operation of the tendered keys through the use of an auxilliary key lock switch function. Information entered and appearing on the indicator can also be cleared by the operation of the clear keyboard key.

The matrix locations of the keyboard which are not indicated as used in the schematic of FIG. 1 can be employed to receive keys of different types to program and configure the keyboard as desired, and in fact the type of keys shown can be substituted for other keys if that is found desirable. Some of the keys to be added would normally identify the category of goods which are being purchased, for example, clothes, food, etc., and the proper category key would normally be operated after entry of the numerical information to cause that information to be added to the appropriate total and clear the keyboard for the entry of the next item. These category keys are normally either taxable keys or non-taxable keys depending on the type of item involved. If a taxable key is operated then the numerical cost is added to the taxable total, and similarly, if a category key associated with a non-taxable item is operated the numerical information is not added to the taxable total.

Alternatively, keys can be added to the keyboard which are associated with a pre-set amount and which would normally be labelled to identify the item, for example, Hamburger, French Fries, Roast Beef, etc. Operation of this type of key would automatically indicate to the system that the price of that item as programmed into the system should automatically be added to the appropriate total — taxable or non-taxable. Accordingly, depending on the type of key which is added to the system, the keyboard can be individually configured and programmed in accordance with the wants and desires of the user.

A still further function can be derived from they keyboard, known as a non-odd function, which permits the manually entered amount (for a category or open type key) or the preset amount (for a preset key) to be added to the respective category or preset total, but not added to the customer (taxable or non-taxable) transaction total.

Figure 4:
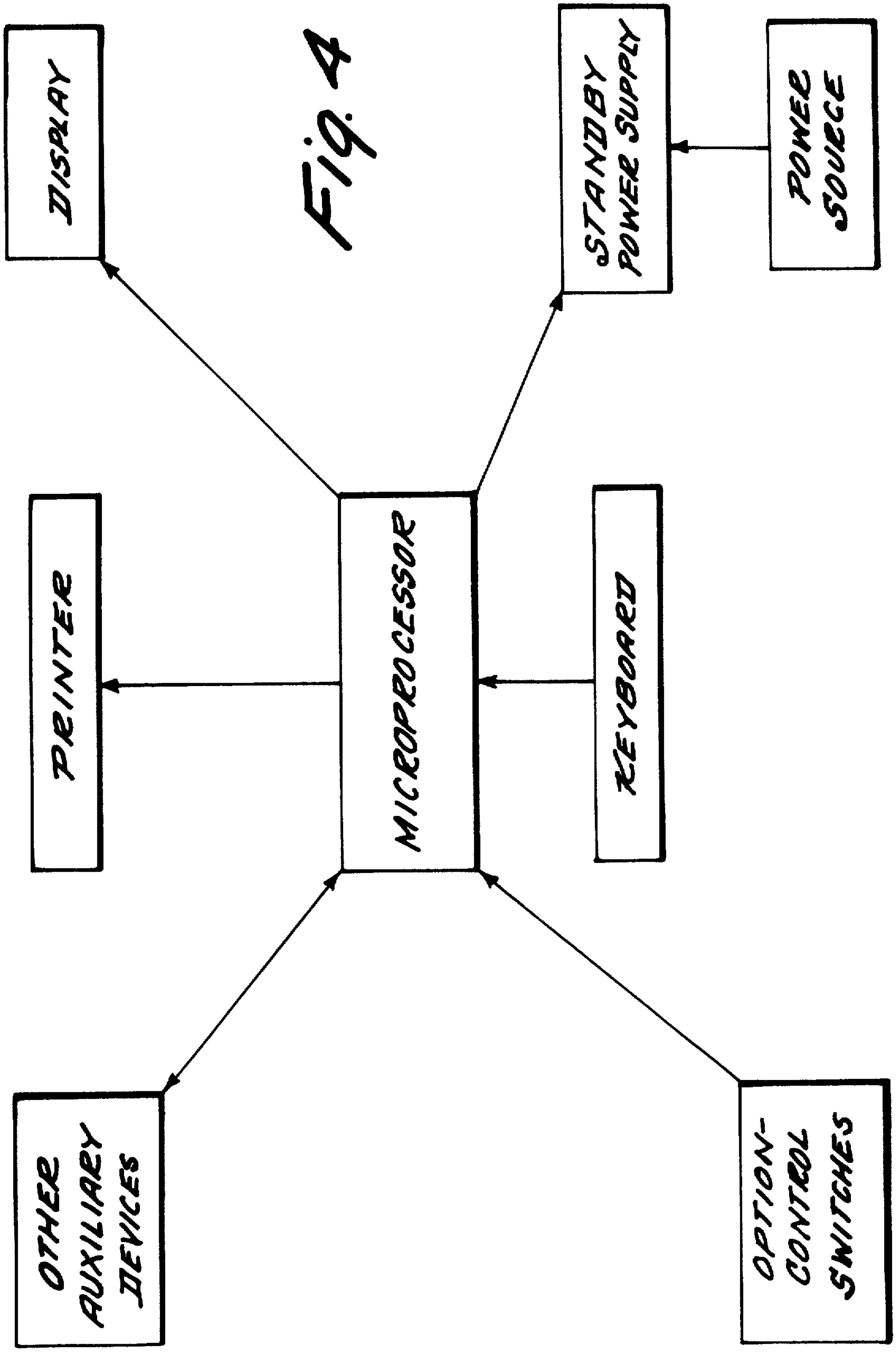
FIG. 4 shows a schematic view of the elements which can be used in the electronic cash register of this invention.

To describe the register functions in detail, the register shown in block diagram in FIG. 4 is a general purpose electronic cash register with a selection of optional expandable capabilities that enable the unit to meet the exact requirements of any given application. The basic register can provide:

1. Up to four customer selected employee or transaction totals.
2. Up to thirty-two customer selected totals that include Department/Product/Category Totals, Credit Balance Totals, and Pre-Set Items.
3. Seven Summary Totals (four basic and three selectable).
4. A receipt, audit tape, and validation printer.
5. Numeric and alpha-numeric indication either front only, or front and rear.
6. Error correction capabilities.
7. Selective itemization.
8. Automatic change calculation and automatic tax calculation.
9. Repeat of multiple items.
10. Price or quantity extension.
11. Selective Department/Product code designation.
12. Credit authorization, Stock status determination, Item number reporting, etc.
13. Local Reporting/Manager Modes.
14. Remote Reporting.
15. Store and Forward Option.

As discussed above, one very important capability of the cash register of this invention is the ability of the individual retailer to choose the totals which he wants. The user may choose the number of employee totals (up to five), the number (up to thirty-two), and type (taxable or non-taxable and additive or non-additive) of Department/Product/Category keys and totals, and the number of summary (up to three) totals required by his individual needs.

In the specific embodiment which is described below, up to four employee or transaction keys can be accommodated, each providing a sales total of $9,999.99. The transaction key is depressed during the total operation. The employee code is printed on the receipt, and audit tape as part of the grand sub-total line. Printed employee or transaction totals are available by placing the manager's keys in either the X (read only), or Z (read and clear) lock and pressing the respective employee key as described below.

Up to thirty-two Department/Product/Category Totals (hereafter referred to as Category totals) of $9,999.99 can be accommodated. Category totals can include taxable or non-taxable additive totals (hardware, grocery, hamburger, shirts), and non-additive totals handled as either an "open" or "pre-set" total.

For "open total" type entries, the operator enters the amount of the 0–9 pad, which is displayed on the indicator, and presses the respective category key. THe transaction is printed on the receipt, and at the user's option, the audit tape with the Category code. The unit automatically provides a taxable and non-taxable subtotal and adds only additive items to the respective subtotal. Last minute add-on items or changes can be made even after the total operation, but prior to the amount tendered operation. Printed Category dollar sales totals are available by placing the Manager's key in either the X or Z lock and pressing the respective key.

Up to 32 Pre-Set keys that retain the price information and automatically record the units sold completely eliminate the need to enter amounts manually. Pre-set prices of up to $9.99 are preferably subject to change by authorized personnel only. Changing prices can involve only the insertion of the manager key, entering the price on the 0–9 pad, and pressing the respective item key. Printed unit sales of pre-set items are available by placing the manager's key in either the X or Z lock and pressing the respective item key. For both open total or pre-set items the user may select the printed code designations from at least 256 possible combinations, thereby providing unique mnemonic codes appropriate to the application's requirements.

The unit provides seven summary totals of which four are basic and three are user selectable. Basic system totals are the non-resettable Grand Total of all Department/Product/Category sales - $9,999,999.99; resettable Grand Total of all Department/Product/-Category sales — $9,999.99; resettable grand total of all taxable sales—$9,999.99; Void Total count—999; and non-resettable Transaction count — 999. Three user selectable summary totals — $9,999.99, can provide a Grand Total for a cash drawer B; check or charge totals (drawer A & B); revolving charge; easy payment; employee account totals, etc. Printed Summary totals are available by placing the manager's key in either the X or Z position and pressing the respective key.

At least three printer options are possible. The first provides a customer receipt and/or audit detail tape. The second provides a customer receipt and a programmed transaction audit detail tape. The third provides a customer receipt, an audit detail tape, and/or the validation of an inserted sales check. Recorded on the customer receipt, audit tape and validated sales check are the: (1) individual item with department or item code and identifier if taxable; (2) taxable total and drawer code; (3) tax; (4) total with employee code and drawer code; (5) amount tendered and drawer code; (6) change; (7) transaction number and date. The type of information printed and its exact location is selectable as indicated by these three alternatives:

| Receipt | | | | Programmed audit | | | Inserted sales check (up to 15 line items) | | | |
|---|---|---|---|---|---|---|---|---|---|---|
| | 1.25GR | (1) | | | | | $T_x$ | 0.25HB | (1) | |
| | 0.20MT | (1) | | | | | $T_x$ | 0.20FF | (1) | |
| $T_x$ | 0.90HW | (1) | | | | | $T_x$ | 0.30MS | (1) | |
| B | 0.90TX$T_L$ | (2) | | | | | A | 0.75TX$T_L$ | (2) | |
| | 0.05TX | (3) | | | | | | 0.03TX | (3) | |
| B | 2.40A $T_L$ | (4) | | | | | A | 0.78R $T_L$ | (4) | |
| B | 3.00CT | (5) | (cash) | B | 0.90TX$T_L$ | (2) | A | 5.00CX | (5) | (check) |
| | 0.60 $C_H$ | (6) | | B | 2.40A $T_L$ | (4) | | 4.22 $C_H$ | (6) | |
| | | | | B | 3.00CT | (5) | | | | |
| 152 | 03AUG | (7) | | 152 | 03AUG | (7) | 457 | 12NOV | (7) | |

Two types of error correction capabilities are preferably encompassed in the register. The first is the ability to correct a partially completed entry. If the operator makes a mistake in entering the amount she can press the CLEAR KEYBOARD key which clears out the numbers entered up to this point (and displayed on the indicator). The second is the ability to Void an item by making a reverse entry. Assume the original entry was 0.73GR. To make the correction, the operator presses the VOID key, enters 73 on the 0–9 pad, and then presses the original department key. The tape will read:

| | |
|---|---|
| 0.73GR | (original entry) |
| 0.73GRV | (void entry) (printed in red) |

The department and customer totals would have been increased by $ .73 with the original entry, and decreased by $ .73 with the void entry. The void counter would be increased by one with the void entry. The register will not allow void entries to carry the customer total to a negative number.

Pre-sorting of taxable and non-taxable merchandise is completely eliminated as each Department/Product-/Item key automatically enters the amount into either the appropriate Taxable Subtotal or the Non-taxable Subtotal. The Taxable Subtotal amount must be recalled for the tax to be added before the sale can be concluded. Normally, after all items have been entered, the operator will hit the TAXED TOTAL key which displays the taxable subtotal on the indicator. She then depresses the AUTOTAX key or else the tax amount is entered on the 0–9 pad and the TAX category key hit. Then one of the TOTAL keys is pressed which displays the total amount and total on the indicator. However, the transaction has not been closed and last minute items can be added or deleted and the transaction totaled again.

After the transaction has been totaled, the operator enters on the 0–9 pad the amount tendered which is displayed on the indicator and either presses CASH TEND, or CHECK TEND. When the key is pressed the total is added to the respective system total and subtracted from amount tendered, and the amount and CHANGE are displayed on the indicator. For example, when the CHECK TEND key is pressed the total is subtracted from the amount tendered, the amount and CHANGE are displayed on the indicator, and the check tendered amount is added to the check tendered total. If in either case the amount tendered is less than the total then CHANGE ERROR is shown on the indicator along with the change due amount. The drawer is prevented from opening until the operator indexes in the amount still due. Pressing the CASH TEND or other systems total key without previously entering an amount omits the change calculation. The amount tendered operation completes and clears the transactions totals and prints the amount tendered, change transaction number, and date, and the customer receipt is advanced to the tear-off position.

When the operator wishes to handle multiple sales she may repeat the department or item key for the number of items involved. Assume the clerk is checking out several identical items, she enters the price on the 0–9 pad, which is then displayed on the indicator, and presses the department key, causing the transaction to be printed on the tape. She then presses the key for each additional identical item, with each transaction being printed on the tape. In the case of the pre-set, the price would not be entered initially but the repeat procedure is identical.

The register can extend multiple-quantity purchases and its multiplication capability is available to be used for other purposes. To make a multi-item open-total entry, the operator keys the quantity on the 0–9 keyboard and presses the extension key X. She then enters the price on the 0–9 keyboard, and hits the appropriate total key. The quantity is printed on the tape, off-set to the left and without numbers in the cents columns. The price is printed next and the total extension is printed on the last line with an X in the far right column indicating an extended total. For a multi-item pre-set, the employee would enter the quantity on the 0–9 keyboard and hit the extension key X. She then presses the appropriate pre-set key. The quantity will be printed on the tape with the item symbol. The pre-set price is then printed on the tape and the total of the extension would be printed on the next line with an X in the far right column indicating an extended total.

| | (Open Total Item) | (Pre-Set Item) |
|---|---|---|
| 5. GR | 12. H | |
| | 0.11 | 0.25 |
| | 0.55 X | 3.00 X |

The customer can also use the unit as a printing calculator to make extensions for the purposes of inventory control, calculating sales commissions, determining sales mix, or for computing fractional unit or price extensions.

Customer number, Part or SKU number and other information may be entered into the cash register and recorded as part of a transaction or as a separate entry. This information may either be immediately transmitted to a central or remote location for credit authorization and on-line stock status determination, or it may be collected and transmitted in a store and forward mode. The Store and Forward option is required when the unit is utilized to collect customer account numbers, inventory or reorder data, payroll information, etc. The employee first enters a two key sequence which identifies the information and how it is to be handled. Then the first five digits of information are entered on the 0–9 keyboard, simultaneously displayed on the indicator, and either the ENTER or SEND key is pressed. With the successful entry or transmission and approval, the information will be printed (1) with the identifier, drawer code, and, in the case of the SEND key, an acknowledgement symbol $A_K$. Then the next five digits of information are entered and displayed and the ENTER or SEND key pressed, which prints the information upon successful entry, or transmission and approval (2). This sequence is repeated until all information in this group has been entered (3). Note: The identifier code need not be entered a second time with the same group of information and several groups of information can be sequentially entered (4).

| Credit Authorization Sequence | Stock Status Determination |
|---|---|
| (Customer No.) A C406.15$A_K$(1) | (SKU No.) B S714.76$A_K$(1) |
| 174.42$A_K$(2) | |
| .31$A_K$(3) | |

Reorder Sequence
(Amt.Reordered) B A1.57$A_K$(1)
(Stock No.) S912.23$A_K$(4)
45.71$A_K$ By unlocking the X lock shown in FIG. 2, the unit is placed in the X (eXamine) mode and all totals can be read and printed but not cleared or changed. After the X lock is unlocked, the desired key is pressed and the respective total is printed (1), along with the drawer code when appropriate (2), total designator (3), eXamine code (4), transaction number (5), and date (6).

EMPLOYEE, OPEN AND SYSTEM TOTALS
(Reading)
(Cash Total Drawer A)

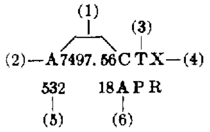

PRE-SET TOTAL
(Reading)
(Pre-Set Hamburger)

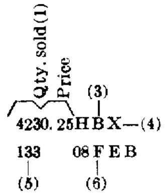

By unlocking the Z lock shown in FIG. 2 the unit is placed in the Z (Zero or Reset) mode and all totals can be read, printed and cleared, or read, printed, and changed. (Note: the non-resettable gross and transaction count cannot be changed). After the Z lock is unlocked the manager can read, print and clear totals by directly pressing the desired key and the total is printed (1), along with the drawer code when appropriate (2), total designator (3), Z code (4), the new (cleared) total (5), the X code (6), transaction number (7), and date (8).

EMPLOYEE, OPEN AND SYSTEM TOTALS
(Reading and Clearing)
(Checks Drawer A)

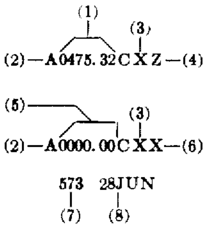

PRE-SET TOTAL
(Reading and Clearing)
(Pre-Set Pizza)

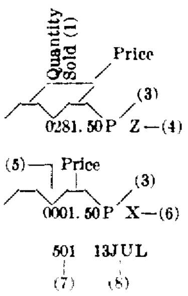

To read, print, and change a total or pre-set price (after the Z lock is unlocked), the manager enters the information on the 0–9 keyboard, then presses the desired key and the existing total is printed (1), along with the drawer code when appropriate (2), total designator (3), Z code (4), the new (changed) total (5), the X code (6), transaction number (7), and date (8).

EMPLOYEE, OPEN AND SYSTEM TOTALS (Clearing and Setting)

(Employee M Total with $25 Bank)

(1) (3)
2271.92M Z—(4)
(5) (3)
0025.00M X—(6)
923 01JAN
(7) (8)

PRE-SET TOTAL (Clearing Total and Changing Pre-Set French Fries)

Quantity Sold (1)
Price
(3)
9730.19F F Z—(4)
(5) (3)
0000.24F F X—(6)
191 21DEC
(7) (8)

By unlocking both the X and Z lock, the product, department, category, system totals and pre-set codes can be set to any of 256 possible combinations. The user may select any combination of the following two groups of letters (T, G, C, J, F, M, A, S, O, N, D, L, R, H, P, and Blank) and (X, T, H, A, E, P, V, C, O, R, F, W, L, S, B, and Blank) to provide a designator code appropriate to this specific needs. The manager enters the information using the shift key and the 0–9 keyboard. He then presses the desired key and the total is printed (1), with drawer code when appropriate (2), total designator (3), code (4), the new changed code (6), the X code (7), transaction number (8), and date (9).

OPEN TOTAL (Entering Grocery)
(Code GR)

(1) (3)
0.00 X—(4)
(5) (6)
00.0GRX—(7)
199 31MAY
(8) (9)

PRE-SET TOTAL (Reading Lunch Special, Zeroing Count and Changing to Dinner Special Prices and Code (1) (3)
4211.95 L S Z—(4)
(Z operation first)
(5) (6)
1.95L S X—(7)
417 05MAR
(8) (9)

PRE-SET TOTAL
(Continued)

(3)
1.95L S X—(4)
(6)
3.95D S X—(7)
418 05MAR
(8) (9)

With the addition of an Answer and Transmission option, and the telephone company's Data Access Arrangement, the unit can be attached to the user's regular telephone line for remote reporting capabilities. The register will answer a telephone inquiry from the central data collection facility, perform and standard "hand shaking" procedures, then transmit the total information collected during the day including: items sold; register totals and sales totals by department, product and employee. The Ans-R-Tran Option can be field added to the unit and is contained within the basic enclosure. The register may alternatively be tied into an on-site system via a four wire connection and operated as an on-line system (with full stand-alone capabilities should the central processor system fail). Or, the Store and Forward Option can be utilized which provides a magnetic record of all transactions, customer sales information, re-order information, SKU items sold, etc. and the tape cassette can be mailed in for EDP processing.

The basic unit preferably provides for the addition of a Store and Forward Option which records all transactions and entries on a magnetic tape cassette. The Store and Forward option will store 30,000 redundantly recorded characters on a cassette cartridge. The cartridge can be readily removed from the unit and mailed in for central processing, recording, re-ordering, etc. The Store and Forward option can be field added to the unit and is contained within the basic enclosure.

Figure 3:
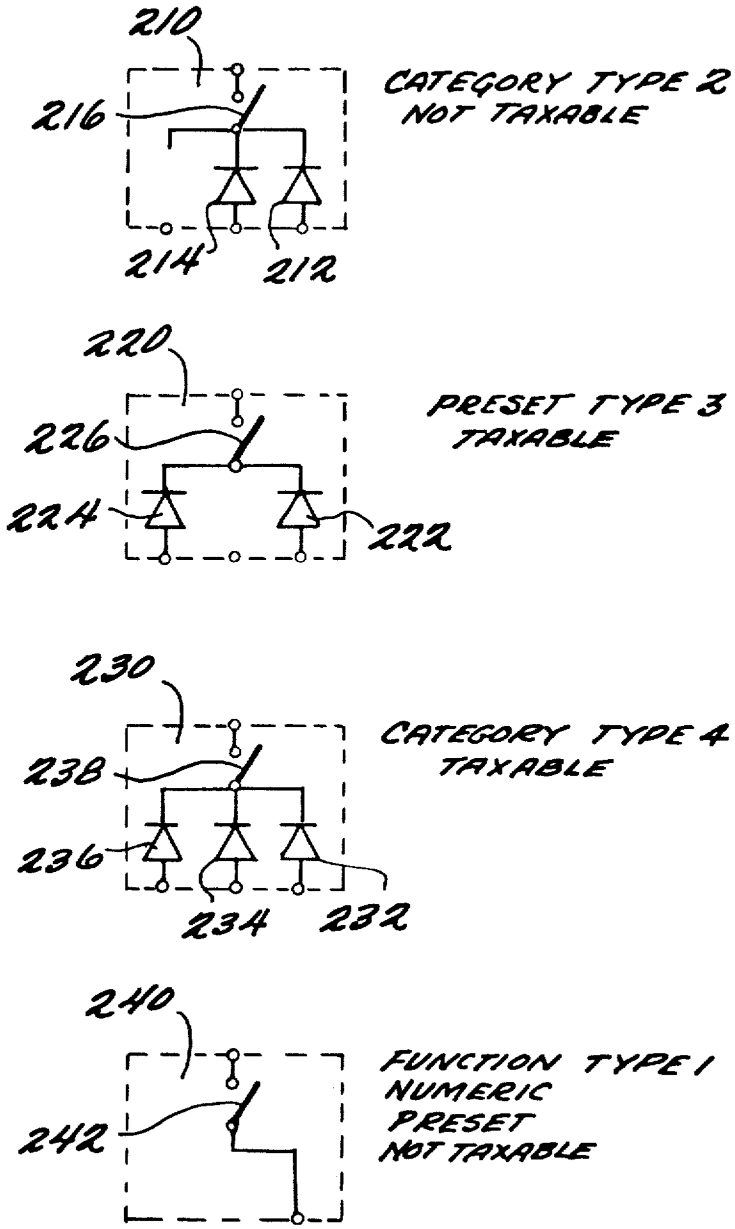
FIG. 3 shows four types of keys which can be employed in the keyboard shown in detail in FIG. 2.

Referring to FIG. 2, which shows a detailed schematic of the keyboard circuitry, there are 64 matrix locations in the specific embodiment described in this application, each adapted for receiving one key of one of the types shown in FIG. 3. Those matrix locations which are intended to receive more than one type of key have associated with them four electrical terminals— terminal one, terminal two, terminal three and terminal four. Those matrix locations which are not expected to be used to receive more than one type of key have only terminals one and four as shown, but it will be appreciated that the four terminal matrix locations could be used at each of the matrix locations if it were desired to be able to program at every possible matrix location. It will be further understood that the size of the matrix can be expanded as desired to produce a keyboard which has all the possible locations for keys which might be needed to enter information in any given application. It should be further noted that not each possible matrix location in the embodiment shown in FIG. 2 is employed, but all such locations could be employed if desired.

Each of the terminals labeled terminal 4 at the matrix locations shown in FIG. 2 is connected to lines 102, 104, 106, 108, 110, 112, 114, and 116 as shown, these lines defining a group of connectors with each connector connecting to a plurality of matrix locations and more particularly to a fourth terminal thereof. Similarly, a further group of connectors each connect to a number of matrix locations and more particularly to a fourth terminal thereof. Similarly, a further group of connectors each connect to a number of matrix locations and more particularly to the first terminal thereof, and to buffer gates 120, 122, 124, 126, 128, 130, 132 and 134 with the outputs of these gates in turn being connected to selector circuitry 138. It should be noted that no two of the matrix locations which connect to any one of the lines which connect to the binary to decimal coder 140 connect to the same one of the group of connectors which are applied to buffer gates 120, 122, 124, 126, 128, 130, 132 and 134.

One shots 150 and 152 together with resistor 154 and capacitor 156 comprise a conventional oscillator circuit which produces a train of pulses on line 160 which are applied to conventional counter 162 to cause that counter to be incremented once for each pulse applied, and to count through a complete cycle and then begin anew. The output of counter 162 is applied on lines 164, 166 and 168 to conventional selector circuitry 138 which enables one of the lines connecting gate 120, 122, 124, 126, 128, 130, 132, or 134 to selector 138 with each line being sequentially enabled one at a time as a function of the output of counter 162.

Similarly, counter 162 is connected as shown to a further counter 170 which is incremented once for each cycle of counter 162. The output of counter 170 is applied to the binary to decimal decoder 140 to sequentially apply an electrical signal to lines 102, 104, 106, 108, 110, 112, 114 and 116. When the signal applied to one of these lines is electrically connected to one of the amplifiers 120, 122, 124, 126, 128, 130, 132 or 134 by a manually operated key of the type shown in FIG. 3, and further that connector is enabled by selector 138, a signal is produced on line 172 causing gate 174 to shift its output condition, in turn causing gate 172 to shift its output condition and apply a signal on line 178 which disables the pulse generator comprised of one shots 150 and 152 and to thus freeze the count in counters 162 and 170, that count indicating the location of the operated key. This signal further causes flag flip-flop 180 to shift its output condition and produce a flag signal on line 182 which indicates to the program circuits 183 which receive the information from the keyboard that a key has been operated and information is now available for entry into the program circuits. The outputs of counter 162 on lines 164, 166, 168 are connected to the program circuits as shown which can thus sample the count therein. The shifting of flip-flop 180 in addition clocks flip-flops 184, 192 and 202 and locks the output of gate 176 low to prevent scanning until flip-flop 180 is set as discussed below.

Further, flip-flop 184 which serves as an inverting counter is connected via gate 186 to two outputs to counter 170 and a third output is connected to program circuits 183 via line 190. Flip-flop 192 is connected via gate 194 to the terminals 2 of each of the matrix locations such that this flip-flop is set if the key that was manually operated had an electrical connection between the fourth terminal and the second terminal. As will be apparent from the discussion below, in this specific embodiment of the invention such a connection means that the key operated was a Category key identifying a specific category of merchandise. The output of flip-flop 192 is connected to program circuits 183 on line 196.

Terminals 3 at the matrix locations are similarly connected to gate 198 via gate 200 to cause flip-flop 202 to shift its output condition if there was an electrical connection between the fourth and third terminals. As will be apparent from the discussion below, such a connection in this specific embodiment means that the key operated is associated with a taxable item. An output of counter 170 is also connected as an input to gate 190 on line 204 and, because only half of the matrix locations in the embodiment shown in FIG. 2 are available to receive different types of keys, the receipt of a signal on line 2 or line 3 automatically identifies the operating key as being among that half.

When the program circuitry has received the information, a flag clear signal is produced on line 206 to set flip-flop 180 which permits the oscillator comprised of one shots 150 and 152 to resume producing its output pulse train and incrementing the count in counters 162 and 170 so that the scanning continues until a further operated key is encountered. In this embodiment, the entire matrix is scanned in about 3 milli-seconds.

These switches labelled A, B, X and Z are also manually operable to indicate certain information such as the cash drawer which is being used or the mode in which the cash register is to operate.

Reference is now made to FIG. 3 which shows four types of keys which can be inserted in the matrix locations shown in FIG. 3. Key 210 is intended to be a category, non-taxable key and includes diodes 212 and 214 connected between the switch 216 which is closed by manual operation of key 210, and the terminals 1 and 2. Similarly, pre-set taxable key 220 includes diodes 222 and 224 which connect terminals 1 and terminal 3 to switch 226. Key 230 which is a category taxable key, includes diodes 232, 234 and 236 connecting terminals 1, 2 and 3 respectively to switch 238. Key 240 which represents a function, numeric or pre-set non-taxable switch simply includes a switch 242 connecting terminal 4 to terminal 1. The matrix shown in FIG. 2 can thus be simply and easily programmed by the insertion of whichever type of key is desired.

According to a further aspect of the invention, the circuitry shown in FIG. 2 prevents the entry of information if two or more keys are simultaneously depressed. As shown, a transistor 250 is connected to each of the first terminals of the matrix locations by a suitable resistor having a value such that if two or more keys are simultaneously operated, the voltage at the base of transistor 250 shifts such as to change the output condition of that transistor which in turn applies a blocking signal to gate 174 which prevents selector 138 from applying a signal to gate 176 to cause that gate to change the output condition of the flag flip-flop 180 and disable the pulse producing generator comprised of flip-flops 150 and 152. The other input to gate 176 is connected to an output to flag flip-flop 180 such that gate 176 is permanently locked low by flag flip-flop 180 to keep the pulse generating circuitry comprised of flip-flops 150 and 152 disabled until the program circuitry has set the flag flip-flop 180 and permitted the scanning to resume.

Reference is now made to FIG. 4 which shows a block diagram of one embodiment of the novel electronic cash register of this invention. As discussed briefly above, a novel microprocessor, which is further shown in block diagram in FIG. 5, controls the flow of transaction information from the keyboard or other device and generates the signals which control the printer, display and any other auxiliary devices which are used with the system as discussed briefly above. The microprocessor includes a first memory section, which is preferably a random access memory, and which stores variable transaction information including a number of different totals which can at least in part be chosen according to the individual desires of the user. A second memory portion, which is preferably a read-only memory, stores a number of instructions and a program for using these instructions to operate on information received by the microprocessor from the keyboard and any other input devices to produce the transaction data that is stored. These instructions and the program for using these instructions can be produced according to well-known computer techniques and form no part of the novel invention of this application.

One type of keyboard which has been found to be particularly advantageous is described in detail below, but it will be understood that any other type of suitable keyboard could be employed and that the keyboard described in FIGS. 1–3 can be expanded or modified as desired. The novel cash register of this application also preferably includes a conventional display which receives signals from the microprocessor and provides visual information to the user of the keyboard as the information is manually entered therein. This display, for example, could show the price of the item which has just been entered in the keyboard and the category or any other information which it is desired to display. Error information is also made available on the display as well as any other data which the user feels desirable to bring to his attention.

The display preferably contains a six-digit, seven-segment type numeric indicator which can display 0.625 inch high numeric digits. Such a display can be clearly visible from as far away as forty feet and at wide viewing angles and preferably incorporates gallium phosphide semi-conductor light emitting diodes as the light source. It may be desirable to include more than six digits for certain foreign export markets. In addition, the display preferably includes a device for displaying up to six message captions for example, approximately 0.3 inches high by 0.9 inches long. The light sources for these messages can be small incandescent lamps with two lamps used for each message to provide redundancy. Four of the messages may be generated under direct program control of the microprocessor while two of the messages are preferably generated solely by external status conditions. These conditions can include the fact that the tape cassette cartridge has run out of tape, or that the cash drawer has been opened or removed or has not been locked off. Other displayed messages can include tax, tax total, total, change, error, change error, etc.

Any conventional printer can be used with the novel cash register shown in block diagram in FIG. 4 to produce a printed record of the transaction containing whatever information the user decides may be desirable and under the control of the microprocessor which produces signals for controlling the printer. A 20-column, drum-type printer with fifteen printing positions per column to provide two identical 10-column, wide slips side-by-side can be employed. One of the slips can then be used as a receipt slip and normally exit from the computer to be torn off and given the customer. The second slip can then be wound internally in the machine to provide a hard copy, audit record. The printer preferably also includes a mechanism for imprinting a small, fixed message on the receipt, for example, to identify the store, department, etc., or to issue a commercial message.

The novel cash register shown in FIG. 4 also preferably contains a number of control or option switches mounted on the terminal housing and used to establish the operating mode of the machine and its printer. As discussed in detail above, the X key lock is mounted on the exterior of the housing and is used by the manager to examine the contents of a total register or to set a printer code designation in combination with the Z switch. The Z key lock is likewise used by the manager to zero or pre-set the contents of a total register or to set a printer code designation in combination with the X key lock. The A key lock and B key lock are employed to unlock A and B drawers. When both the A and B switches are locked off, the terminal is placed onto a stand-by status by the microprocessor with the printer motor off and the lock status lamp lit as discussed briefly above. A clear all push button which is preferably mounted internally permits a power clear pulse to be issued which will zero out all of the memory and re-start the machine. Of course, this switch would not normally be employed by the user. A receipt delete switch to delete all print-out on the receipt slip and an audit delete switch which deletes print-out of line item entries are also preferably provided together with an AB toggle switch to select the A or B cash drawer, provided both are unlocked.

The power supply as shown in FIG. 4 is preferably separately housed and includes conventional circuits for isolating the cash register from the input AC line voltage fluctuation and also capable of completely powering the unit for at least 90 minutes following an outage. The power supply preferably is capable of operating on either 110 or 220 volts, 60 or 50 hertz frequency with 250 watts peak. The power supply thus protects the memories in the microprocessor as well as the other electronic elements from a loss of information resulting from power outage which would require re-programming of the unit and at the same time permits operation of the device during a power failure.

A number of other auxiliary devices can be used with the novel cash register of this invention as mentioned briefly above. The unit can be interfaced with a telephone or direct line communication facility to a computer or the like. In addition, or alternately, a tape cassette can be coupled to the microprocessor to record the transaction information in place of the printed tape or in addition thereto to provide a magnetic audit tape. An auxiliary input device such as a tag or badge reader can be used to input transaction information into the microprocessor as an alternative or in addition to the manually operated keyboard. The unit can be made part of a central or regional report collecting arrangement which includes a central processing facility which receives credit information and transmits decisions with respect to credit transactions to remote facilities.

Figure 5:
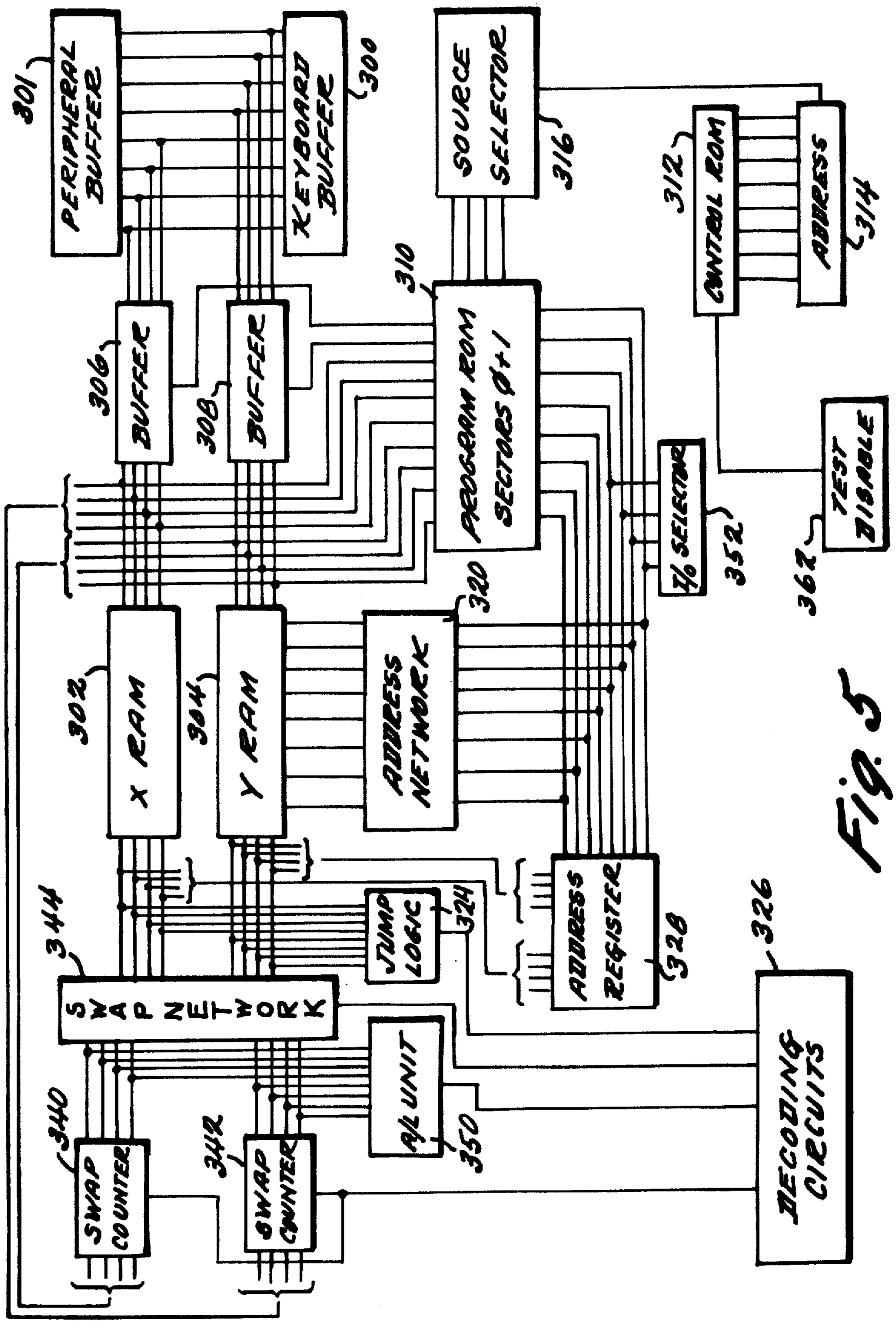
FIG. 5 shows a block diagram of the electronic elements which comprise the microprocessor shown in block diagram of FIG. 4.

Reference is now made to FIG. 5 which shows a block diagram of the electronic elements which comprise the microprocessor shown in FIG. 4 and described above. Each of the electronic elements, which in combination comprise the novel microprocessor of this invention which in turn forms a part of the novel cash register, is a conventional electronic element and the construction and availability of these elements are well-known in the art. Accordingly, no detailed description of the particular elements involved is necessary or appropriate.

The information from the keyboard, generated as described above, is lodged in a keyboard buffer circuit 300 which is connected to the two portions 302 and 304 of the RAM memory by buffers 306 and 308. Buffers 306 and 308 are under the control of the program ROM 310 for writing the information entered in the keyboard into the X and/or Y RAMS 302 and 304 at appropriate times as determined by the program lodged in the control ROM 312 as discussed below. RAM portions 302 and 304 together preferably comprise a 256 word by eight bit, semi-conductor, random access memory which also includes eight special address locations designated as general registers and eight other special address locations used as special registers. As discussed above, the random access memory in the novel microprocessor shown in FIG. 5 serves to store variable transaction data such as totals, etc. according to the program which is placed in the control ROM 312 to provide the transaction data by sequentially causing the instructions lodged in the program ROM 310 to be carried out to produce the different types of totals desired by the individual user and other transaction data.

Control ROM 312, which contains the program, is connected to the program ROM 310, which contains the individual instructions, by a conventional addressing circuit 314 and source selecting circuit 316 which chooses which of the two sectors in control ROM 312 is to be addressed. Program ROM 310 is likewise connected to the X RAM and Y RAM via a conventional address network 320 which controls the location of and which information is read into and out of the two RAMS. These RAMS preferably have a number of sectors with moves between the various sectors being controlled according to jump logic 324 which is in turn controlled by the control ROM 312 which applies its signals via conventional decoding circuits 326. Address register 328 also stores addresses and is connected to the address network 320 and the inputs to RAM 302 and 304 as shown.

The outputs of buffers 306 and 308 are also connected via swap counters 340 and 342 to a conventional swap network 344 which can place the signals on the one set of four lines onto the other set of four lines and viceversa. Swap counters 340 and 342 are controlled by the program signals produced by control ROM 312 and applied via the decoding circuits 326, so that during certain program operations swaps can take place.

As also discussed above, the microprocessor preferably includes a conventional arithmetic unit 350 which performs arithmetical functions and produces signals which are applied to the input to swap network 344 as shown to produce transaction data which can be applied and stored in the RAM memory comprised of X RAM 302 and Y RAM 304. Input-output selector circuitry 352 is also connected to the output to address register 328 for controlling the various devices shown in FIG. 4 which are operated by the microprocessor.

The control ROM and program ROM can be programmed according to conventional techniques to carry out manipulations within the circuitry to move infor-mation from one location to another, to perform logical functions and to carry out the arithmetical functions which are desired to produce the exact transaction data which an individual user may desire. Such programming techniques are also well-known in the art and no particular discussion of these techniques is believed necessary. It will be understood that any suitable programs for carrying out these functions can be employed.

Also, as mentioned briefly above, control ROM 312 can be disabled by circuitry 362 for performing a check on the operation of the system. When the disabled circuitry 362 is operative, a test program can be connected to address circuitry 314 in place of the control ROM 312 to produce a set of program instructions which check the correct operation of the remainder of the circuitry.

Many other changes and modifications in the above embodiment of the invention can, of course, be made without departing from the scope of the invention, and accordingly that scope is intended to be limited only by the scope of the appended claims.

What is claimed is:

1. An electronic cash register comprising:

keyboard means having a plurality of keys for manually entering information including means for producing a signal upon manual operation of one of said keys indicating the key operated;

information processing means connected to said keyboard means for receiving said signals including first memory means including a random access memory for storing variable transaction data derived from signals received from said keyboard means said random access memory including first and second memory portions, second memory means for storing instructions for deriving said transaction data from said received signal, means connected to said first and second memory means for carrying out said instructions to derive said transaction data and for causing said transaction data to be stored in said first memory means, buffer means connected to said keyboard means, first and second groups of data input lines connected to said buffer means, gates means connecting said first and second line groups to said first and second memory portions, means connected to said first and second groups of lines, connected to said carrying and causing means for placing the signals of said first group of lines onto said second group of lines and the signals of said second group of lines onto said first group of lines so as to produce swapped signals and connected to said first and second portions for applying said swapped signals to said first and second portions; and display means connected to said information processing means for displaying transaction information.

2. A cash register as in claim 1, further including means for connecting said information processing means to a source of voltage so as to supply electrical energy to said information processing means and said keyboard means including standby means for supplying voltage to said information processing means and said keyboard means to permit continued operation in the event said source of voltage is discontinued.

3. A register as in claim 1, wherein said carrying and causing means includes means for carrying out arithmetical functions.

4. A register as in claim 1, wherein said second memory means includes a read only memory.

5. A register as in claim 4, wherein said information processing means further includes means for disabling said read only memory for testing said information processing means.

6. A register as in claim 1, including means for producing a printed tape recording of at least part of said transaction information.

7. A register as in claim 1, wherein said first memory means includes means for storing a plurality of customer selected totals.

8. An electric cash register comprising:

keyboard means having a plurality of keys for manually entering information including means for producing a signal upon manual operation of one of said keys indicating the key operated;

electronic information processing means connected to said keyboard means for receiving said signal including means for producing transaction information from said signals, means for storing at least part of said transaction information including a random access memory; buffer means connected to said keyboard means, first and second groups of data input lines connected to said buffer means, gates means connecting said first and second line groups to said first and second memory portions, means connected to said first and second groups of lines, connected to said carrying and causing means for placing the signals of said first group of lines onto said second group of lines and the signals of said second group of lines onto said first group of lines so as to produce swapped signals and connected to said first and second portions for applying said swapped signals to said first and second portions, and means for producing display signals for causing display of at least part of said transaction information; and means for connecting said information processing means and keyboard means to a source of voltage so as to supply electrical energy to said information processing means and said keyboard means including standby means for supplying voltage to said information processing means and said keyboard means to permit continued operation in the event said source of voltage is disconnected.

* * * * *